Sept. 5, 1961 B. L. BYRD, JR 2,998,838
PIPE BENDING RACK
Filed July 23, 1959 2 Sheets-Sheet 2
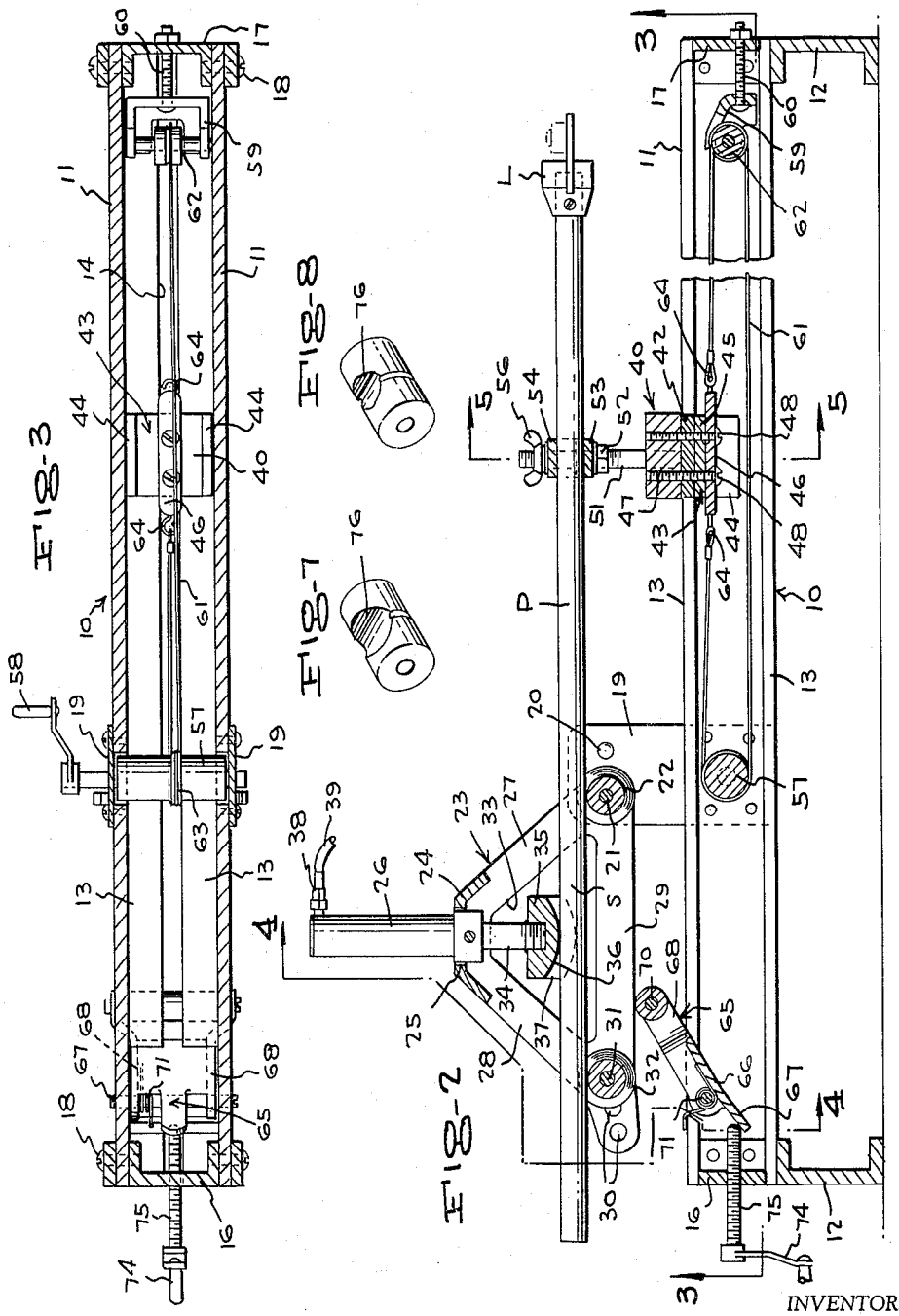
INVENTOR.
BERRY L. BYRD JR.
BY
Christian R. Nielsen
ATTORNEY

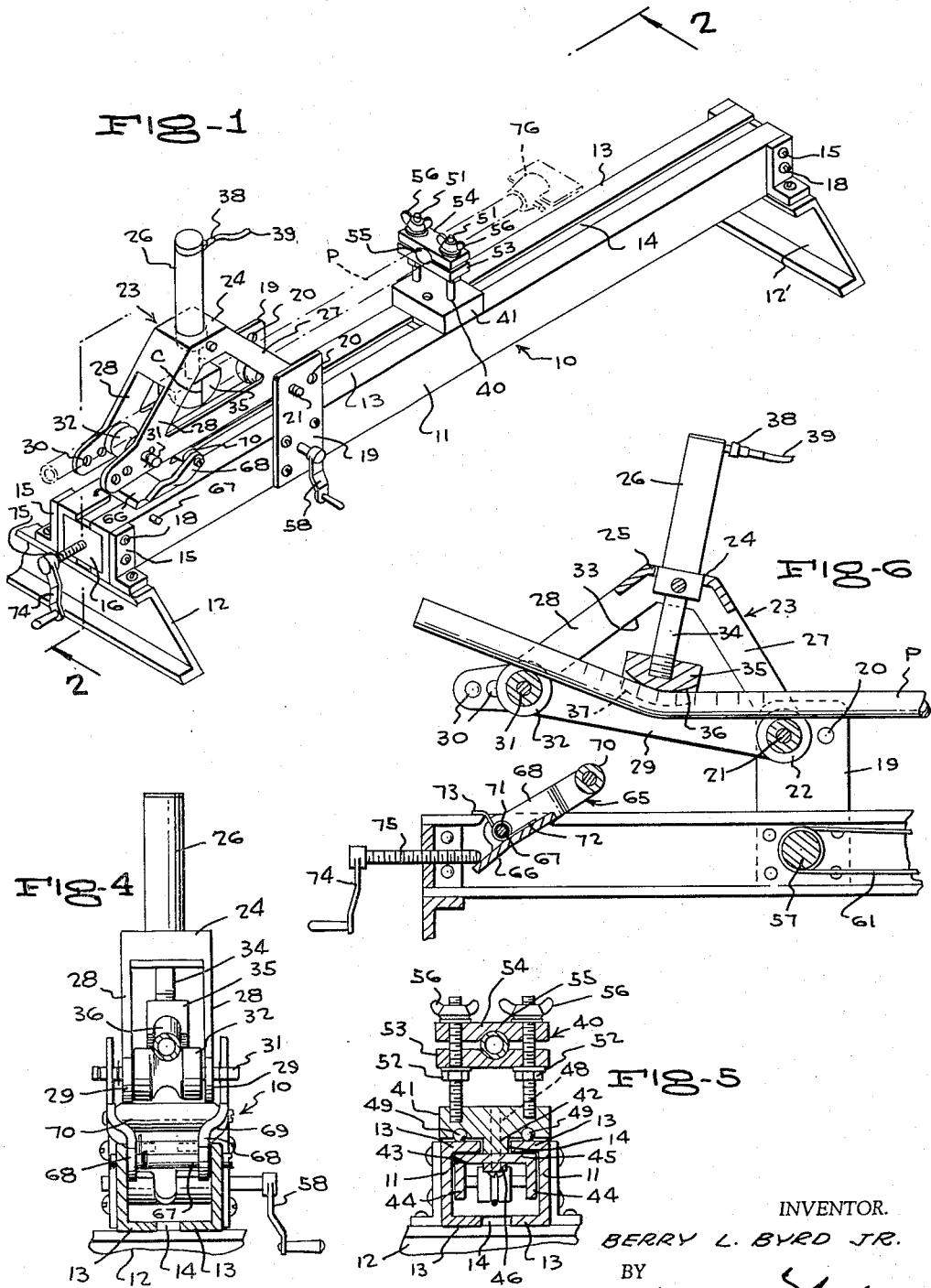

United States Patent Office 2,998,838
Patented Sept. 5, 1961

2,998,838
PIPE BENDING RACK
Berry Lorenz Byrd, Jr., 808½ 15th St., Lipscomb, Ala.
Filed July 23, 1959, Ser. No. 829,010
3 Claims. (Cl. 153—32)

This invention relates to a pipe bending rack and it consists in the constructions, arrangements and combinations herein described and claimed.

It is an important object of the invention to provide a pipe bending rack in which the pipe to be bent is advanced within a hydraulically operated press head a desired predetermined distance to form a required radius curvature in the pipe upon operation of a presser foot of the press head.

More specifically, it is an object of the invention to provide a pipe rack, the frame of which slidably supports a pipe clamping means so constructed as to firmly hold the pipe against turning movements during bending and thus obtain a proper radial curvature in the pipe when bending pressure is applied to the pipe by means of a hydraulic pressure head, the pipe clamping means being slidably adjustable toward and through the pressure head in measured distances along the pipe length; the pressure head having a cradle for guiding support of the pipe as well as means for adjusting the cradle so that angular bends may be formed in the pipe.

Additional objects, advantages and features of invention will be apparent from the following description, considered in conjunction with the accompanying drawings, wherein FIGURE 1 is a perspective view of the pipe bending rack.

FIGURE 2 is a longitudinal sectional view taken on the line 2—2 of FIGURE 1.

FIGURE 3 is a longitudinal section taken on the line 3—3 of FIGURE 2.

FIGURE 4 is a vertical section taken on the line 4—4 of FIGURE 2.

FIGURE 5 is a cross section on the line 5—5 of FIGURE 2.

FIGURE 6 is a fragmentary sectional view illustrating the relative positions of the pressure head and pipe cradle during the bending operation.

FIGURE 7 is a perspective view of a modified form of support roller for the pipe during horizontal movement through the cradle, and FIGURE 8 is a similar view of a further form of supporting roller.

There is illustrated a pipe bending rack generally indicated by the reference character 10 and as shown comprises an elongated frame defined by parallel side beams 11 supported by pedestals 12 at respective ends. The side beams 11 are of channel formation, the flanges 13 being arranged in opposed spaced relation forming a longitudinal guide-way 14. The side beams 11 may be secured to the pedestals 12 and 12' in any desired manner and in the present instance, angle iron braces 15 are shown.

One end of the side beams 11 is closed by a channel bar 16, while the opposite end is closed by a similar bar 17 and suitably bolted to the beams 11 as at 18, thus providing a rack which is rigid and sturdy.

Upon the outer faces of the beams 11, respective upright plates 19 are bolted, the plates extending above the beams a suitable distance and arranged in opposed relation, each plate having at least two spaced openings 20 which form bearings for a shaft 21 for rotatably supporting grooved guide roller 22 of a cradle 23. The shaft 21 is selectively engaged in the openings 20 to vary the position of the cradle.

The cradle 23 comprises a head member 24 which is provided with a medial opening 25 for receiving and mounting a hydraulic unit 26 and further includes a pair of opposed rear leg members 27 and a similar pair of front leg members 28, the legs being inclined in opposite directions and the legs of aligned pairs are connected by a longitudinally extending flange or lower bar 29 which terminates beyond the front legs 28, the terminal portions of the bars 29 being provided with spaced openings 30 in which a shaft 31 of a grooved guide roller 32 may be selectively mounted. It will be noted that the legs 27, 28 and longitudinal bars 29 define an opening 33 of substantially triangular formation for a purpose presently to be explained.

The hydraulic unit 26 includes a piston (not shown) having a rod 34 the lower end of which is threaded for securement of a proper pressure foot 35, the operating face 36 of which has an arcuate contour and opposed side walls 37 so as to readily embrace a pipe to be bent. Hydraulic fluid is delivered to the unit 26 by means of fittings 28 and hose 39, the flow of fluid being controlled by means of a suitable valve not shown.

In order that the pipe may be progressively advanced into and through the cradle and beneath the pressure foot 35, a longitudinally slidable pipe clamp 40 is employed, and as best seen in FIGURE 5, comprises a heavy metallic body member 41 of a width to rest upon the upper flanges 13 of the side beams 11, the body member having a depending rib 42 of a width to slidably engage within the guide-way 14 defined by the opposed edges of the beams 11. To insure a straight sliding movement of the body member 41, a short section of channel iron 43 is employed, the side flanges 44 of which contacts the inner faces of the beams 11, while the web portion 45 is drawn into contacting relation with the under sides of the flanges 13, as will now be described. The web portion 45 is formed with suitable bolt openings and a draw bar 46 is provided with openings adapted to register therewith, as well as threaded openings 47 formed in the body member 41 and through these openings, bolts 48 are secured. To further insure smooth and ready sliding of the clamp 40 suitable raceways are formed in the underside of the block for housing ball bearings 49 for rolling contact with the adjacent faces of the flanges 14.

In the upper face of the block 41, a pair of spaced threaded openings 50 are formed, positioned transversely and medially of the block and into these openings respective upright posts 51 are secured. Each post is provided with a lower nut 52 which will be positioned at the same horizontal level for support of a clamp plate 53 and thereabove a second clamp plate 54 is supported, each clamp being formed with openings for passage of bolts therethrough.

The opposed faces of the clamp plates 53 and 54 are formed with a semi-circular recess 55 forming a seat for partially enclosing and gripping a pipe upon tightening the wing nuts 56 engaged upon the upper end of the upright posts.

In order for an operator to control the sliding movement of the pipe clamp at a convenient position adjacent the press head and cradle 23, a drum 57 is rotatably mounted between the side beams 11 and the plates 19, the shaft of the drum extending beyond one of the beams for securement of a crank handle 58. Medially of the channel bar 17 of the frame, a yoke 59 is mounted upon a bolt 60, the bolt being adjustable to move the yoke backwardly and forwardly to adjust the tension of a drive belt 61 trained about a pulley 62 rotatably mounted in the yoke and the drum 57. It will be noted from FIGURE 3, that the belt 61 has several turns about the drum 57 as indicated at 63 and that respective ends of the belt are connected to an eyelet 64 at the ends of the draw bar 46.

It will be seen from a consideration of FIGURE 6, that the cradle 23 pivots upon the shaft 21 during the bending operation, but in normal position of the cradle the longitudinal bars 29 adjacent the free end thereof will rest upon an adjustable pivoted lever 65 (see FIGURE 2).

The lever 65 consists of a body plate 66 of a width to be pivotally mounted between the beams 11 by means of a pivot pin 67. The plate 66 is provided with a pair of arms 68 which are offset outwardly as at 69 (see FIGURE 4) and between the ends of the arms 68, a support roller 70 is mounted, the offset portion 69 permitting the use of a roller of such length as to afford substantial support of the longitudinal bars 29 of the cradle. A helical spring 71 is positioned upon the shaft 67 one end 72 contact the plate 66 while the other end 73 engages a flange of the frame, the spring tending to move the lever 65 in a downward direction away from the cradle.

Adjustment of the lever 65 with respect to the cradle, is effected by rotation of the crank 74 for rotating a threaded shaft 75 threaded through the end plate 16, the free end of the shaft inpinging upon a rear end of the plate 66. It will be readily seen that rotation of the crank in one direction will raise the arms 68 and roller 70 to elevate the cradle, while rotation of the crank in the opposite direction will lower the cradle, which movements are necessary to obtain proper levels between the clamp 40 and guide rollers 22 and 32 for varying bends in a pipe.

In FIGURES 7 and 8, modified forms of the rollers 21 and 32 is shown. In these figures a concavity 76 is disclosed upon one side of the rollers which may be of different widths and depths to accommodate pipes of varying diameters.

In use, the top clamp plate 54 may be loosened or removed to permit the pipe P to be positioned within the seat 55 of the lower plate 53, the pipe being advanced through the cradle 23 so that it rests in the grooved guide rollers 21 and 32. The pipe P is adjusted to lie in a horizontal level by means of a level and support L which may be detachable secured to the rear end of the pipe, the front end of the pipe being raised or lowered by manipulating the crank 74 for rotating the shaft 75 to elevate or lower the cradle 23. When the level on the support L indicates a level position of the pipe, the clamping plate 54 may be tightened by the wing nuts 56.

Prior to placement and securement of the pipe within the rack, as above described, the bend desired to be formed in the pipe is previously determined and properly indicated on the side of the pipe by scale markings indicated at S, while the pressure foot 35 has a center position indicator C, the markings S being progressively advanced and aligned with the indicator C during bending operations. It will be seen from FIGURE 1, by virtue of the spacing of the legs 27 and 28 to provide the opening 33, the center mark C may be readily aligned with the markings S on the pipe.

With the pipe in position as shown in FIGURE 2, with the pressure foot in proper position upon one of the markings on the pipe, it is only necessary for the operator to actuate a control valve (not shown) to admit hydraulic pressure to the unit 26 to force the pressure foot downwardly upon the pipe causing the pipe to assume the desired curvature. Such downward movement causes the cradle 23 to swing upwardly upon the shaft 21, as shown in FIGURE 6. Upon release of pressure in the unit 26, the pipe may be advanced to the next pipe marking, by merely causing the pipe clamp 40 to advance in the direction of the cradle 23, this being effected upon rotation of the crank 58, so as to draw the upper reach of the drive belt 61 in the direction of the cradle. The longitudinal movement of the pipe clamp is also necessary to accommodate varying lengths of pipes.

While I have shown and specifically described a preferred construction of the pipe bending rack, this is by way of illustration only, and I consider as my own all such modifications in construction as fairly fall within the scope of the appended claims.

I claim:

1. In a pipe bending rack comprising in combination with a longitudinal support frame having a planiform upper face, a longitudinal guide-way formed medially thereof, a pipe clamp slidably supported on said planiform upper face and having a depending rib disposed in said guide-way, upright plate means fixed to respective sides of the frame and arranged in parallel opposed relation; a substantially triangularly shaped cradle defined by front and rear legs, an upper integral head member and horizontal lower bars; a shaft positioned traversely of said plate means, the rear end of the horizontal bars being positioned between said upright plate means and pivotally mounted upon said shaft to permit upward and downward movements of the cradle, a transverse shaft connected between said horizontal bars at the forward end thereof, each of said shafts having a grooved rotatable roller mounted thereon affording support of a pipe to be bent, means for selectively moving said pipe clamp toward and away from said cradle, means carried by the frame and positioned beneath said horizontal bars for adjusting the horizontal level of said forward roller with respect to said pipe clamp and a pressure unit mounted in said head member of the cradle and having a pressure foot movable at a right angle to the axis of said rollers for contacting engagement with a pipe secured in said pipe clamp and supported in said rollers.

2. The structure of claim 1, in which the means for moving the pipe clamp comprises a yoke member adjustably connected to a rear wall of the support frame, said yoke rotatably supporting a pulley, a transversely extended drum rotatably supported between the sides of the frame and having an operating handle, said pipe clamp having anchorage means at respective ends thereof, a drive belt trained about said pulley and having several convolutions about said drum, the terminal ends of said drive belt being secured to respective anchorage means on said pipe clamp.

3. The structure of claim 1, in which the means for adjusting the horizontal level of the forward support roller of the cradle comprises a spring tensioned plate hingedly mounted on the longitudinal support frame and having opposed arms, a roller mounted between and at the ends of said arms, an adjustable bolt mounted in the adjacent end of the frame and engaging a rear portion of the plate for raising said roller into engagement with said horizontal bars of the cradle.

References Cited in the file of this patent

UNITED STATES PATENTS

| | | |
|---|---|---|
| 319,603 | Muncaster | June 9, 1885 |
| 643,760 | Brinkman | Feb. 20, 1900 |
| 1,013,839 | Cox | Jan. 2, 1912 |
| 1,567,107 | Bonn | Dec. 29, 1925 |
| 2,277,204 | Byler | Mar. 24, 1942 |
| 2,604,924 | Blake et al. | July 29, 1952 |

FOREIGN PATENTS

| | | |
|---|---|---|
| 303,574 | Germany | Dec. 24, 1919 |
| 516,924 | Belgium | Jan. 31, 1953 |